US012811465B2

(12) United States Patent
Gecgel et al.

(10) Patent No.: US 12,811,465 B2
(45) Date of Patent: Nov. 24, 2026

(54) SEALING ARRANGEMENT FOR A DEVICE FOR DRIVING A COMPRESSOR AND DEVICE FOR DRIVING A COMPRESSOR AND A METHOD FOR PRODUCING A CONNECTION ARRANGEMENT

(71) Applicant: Hanon Systems, Daejeon (KR)

(72) Inventors: Senol Gecgel, Cologne (DE); Oliver Gormanns, Mönchengladbach (DE); Thomas Alberternst, Aachen (DE); Bernd Guntermann, Lennestadt (DE)

(73) Assignee: HANON SYSTEMS, Daejeon (KR)

( * ) Notice: Subject to any disclaimer, the term of this patent is extended or adjusted under 35 U.S.C. 154(b) by 245 days.

(21) Appl. No.: 18/495,387

(22) Filed: Oct. 26, 2023

(65) Prior Publication Data

US 2024/0146147 A1 May 2, 2024

(30) Foreign Application Priority Data

Oct. 28, 2022 (DE) ..................... 10 2022 128 663.0
Aug. 2, 2023 (DE) ..................... 10 2023 120 482.3

(51) Int. Cl.
*H01B 17/30* (2006.01)
*F04C 23/00* (2006.01)
(Continued)

(52) U.S. Cl.
CPC ........... *H02K 5/225* (2013.01); *F04C 27/008* (2013.01); *H01B 17/306* (2013.01);
(Continued)

(58) Field of Classification Search
CPC ........ H05K 5/10; H05K 5/225; H01B 17/303; H01B 17/305; H01B 17/306;
(Continued)

(56) References Cited

U.S. PATENT DOCUMENTS 3,688,006 A * 8/1972 Keller .................. H01B 17/305 174/152 R
3,708,612 A * 1/1973 Saxon .................. H01B 17/306 439/736
(Continued)

FOREIGN PATENT DOCUMENTS

CN 209329215 U 8/2019
DE 2309825 A1 9/1973
(Continued)

*Primary Examiner* — Oluseye Iwarere
*Assistant Examiner* — Daniel K Schlak
(74) *Attorney, Agent, or Firm* — Shumaker, Loop & Kendrick, LLP; James D. Miller

(57) ABSTRACT

A sealing arrangement for passing electrical connections through a wall of a casing for a device for driving a compressor. The sealing arrangement has a connection arrangement with at least one electrically conductive connecting element and a holding element. The at least one connecting element is arranged within a through hole formed in the holding element and through a feedthrough hole of the casing so as to protrude into a volume enclosed by the casing. The holding element is formed as an injection-molded component made of a plastic. A joining element is arranged between the holding element and the at least one connecting element, which full-circumferentially encloses the at least one connecting element. As a result, the holding element full-circumferentially encloses the joining element.

18 Claims, 6 Drawing Sheets

(51) Int. Cl.

| | |
|---|---|
| ***F04C 23/02*** | (2006.01) |
| ***F04C 27/00*** | (2006.01) |
| ***H01B 17/58*** | (2006.01) |
| ***H01R 13/52*** | (2006.01) |
| ***H01R 43/00*** | (2006.01) |
| ***H02K 5/10*** | (2006.01) |
| ***H02K 5/22*** | (2006.01) |
| ***H02K 11/33*** | (2016.01) |

(52) U.S. Cl.

CPC ........... *H01R 13/521* (2013.01); *H02K 11/33* (2016.01); *F04C 23/008* (2013.01); *F04C 23/02* (2013.01); *H01B 17/583* (2013.01); *H01R 13/5208* (2013.01); *H01R 43/005* (2013.01); *H02K 5/10* (2013.01)

(58) Field of Classification Search

CPC ............. H01B 17/308; H01R 13/5208; H01R 13/521; H01R 43/005; F04C 23/008; F04C 27/008

USPC ............................................................ 310/71

See application file for complete search history.

(56) References Cited

U.S. PATENT DOCUMENTS 3,728,466 A * 4/1973 Rocton ................ H02G 15/085 156/48
3,770,878 A * 11/1973 Dozier ................. H01R 13/405 439/736
3,922,477 A * 11/1975 Glowacz .............. H01R 13/521 439/736
3,988,053 A * 10/1976 Dodenhoff ........... H01R 13/521 428/432
4,103,416 A * 8/1978 Sakamoto ............ H01B 17/305 65/59.1
4,252,394 A * 2/1981 Miller .................. H01B 17/305 439/926
4,461,925 A * 7/1984 Bowsky ............... H01B 17/305 439/736
4,780,578 A * 10/1988 Heskel ................... H01H 19/06 200/11 R
5,414,318 A * 5/1995 Shimizu ................. H02K 5/148 310/239
2004/0029443 A1* 2/2004 Quadir ................. H01B 17/306 439/587
2005/0111994 A1* 5/2005 Kimura ............... F04C 18/0215 417/313
2008/0138226 A1* 6/2008 Koitabashi ......... H01R 13/5205 418/55.1
2009/0032283 A1* 2/2009 Sjoberg ................ H01B 17/308 174/152 R
2009/0285703 A1* 11/2009 Osaka .................. H01R 13/521 417/410.1
2011/0083897 A1* 4/2011 Paterek ................ H01R 13/521 174/667
2012/0087811 A1* 4/2012 Yamada .................. F04B 39/12 417/410.1
2012/0228023 A1* 9/2012 Fukasaku ............ F04C 18/0215 174/668
2013/0140056 A1* 6/2013 Adachi .............. H01R 13/5845 174/120 SR
2014/0045369 A1* 2/2014 Klaassen .............. H01R 13/521 439/519
2016/0020547 A1* 1/2016 Khadkikar ............ F04B 39/121 439/587
2017/0194080 A1* 7/2017 Nara ........................ H02G 3/22
2021/0233686 A1* 7/2021 Paletko ................ H01B 17/583
2021/0234300 A1* 7/2021 Fukushima .............. H01R 9/16
2022/0181941 A1* 6/2022 Seok .................... B60H 1/3222
2022/0354012 A1* 11/2022 Maegawa ............. F04B 39/121
2022/0416451 A1* 12/2022 Su ....................... F04C 18/0215
2023/0156937 A1* 5/2023 Hartl ....................... F04B 39/14 361/807
2024/0117801 A1* 4/2024 Yogo ....................... F04B 39/00
2025/0237216 A1* 7/2025 Lee ........................ H02K 11/30
2026/0074095 A1* 3/2026 Hartl .................... H01B 17/301

FOREIGN PATENT DOCUMENTS

| | | | | | |
|---|---|---|---|---|---|
| DE | 10127488 | A1 * | 1/2003 | ........... | H01R 13/405 |
| DE | 102006001340 | A1 | 7/2007 | | |
| DE | 112015001426 | T5 | 12/2016 | | |
| EP | 2661161 | A1 * | 11/2013 | ........... | H02G 15/013 |
| GB | 961770 | A * | 6/1964 | ........... | H01B 17/306 |
| JP | 59004178 | U | 1/1984 | | |
| JP | 2003257566 | A | 9/2003 | | |
| JP | 2011146230 | A | 12/2016 | | |
| KR | 1020160082205 | A | 8/2016 | | |
| KR | 102172263 | B1 | 10/2020 | | |
| KR | 102583934 | B1 | 10/2023 | | |

* cited by examiner

SEALING ARRANGEMENT FOR A DEVICE FOR DRIVING A COMPRESSOR AND DEVICE FOR DRIVING A COMPRESSOR AND A METHOD FOR PRODUCING A CONNECTION ARRANGEMENT

CROSS REFERENCE TO RELATED PATENT APPLICATIONS

This patent application claims priority to German Patent Application No. 10 2023 120 482.3 filed on Aug. 2, 2023 and German Patent Application No. 10 2022 128 663.0 filed on Oct. 28, 2022, the entire disclosures of each of which are hereby incorporated herein by reference.

FIELD

The invention relates to a sealing arrangement for passing electrical connections through a wall of a casing for a device for driving a compressor, and a device for driving a compressor, in particular an electric motor, for compressing a vaporous fluid, especially a refrigerant. The compressor can be utilized in the refrigerant circuit of an air conditioning system of a motor vehicle. The invention also relates to a method for producing a connection arrangement of the sealing arrangement.

BACKGROUND

Compressors known from the prior art for mobile applications, in particular for air conditioning systems of motor vehicles, for conveying refrigerant through a refrigerant circuit, also referred to as refrigerant compressors, are often formed as piston compressors with variable displacement or as scroll compressors, regardless of the refrigerant. The compressors are driven either by a pulley or electrically.

In addition to the electric motor for driving the respective compression mechanism, an electrically driven compressor has an inverter for driving the electric motor. The inverter serves to convert direct current from a vehicle battery into alternating current, which is supplied to the electric motor through electrical connections.

Conventional electric motors of the electrically driven compressors can be formed with an annular stator core with coils arranged thereon, and a rotor, with the rotor being arranged inside the stator core. Rotor and stator are aligned on a common axis of symmetry or axis of rotation of the rotor.

The inverter has plug terminals for plug-in connectors formed as pins for establishing electrical connections to terminals of the electric motor, which in turn are electrically connected to connection lines of lead wires of the coils of the stator, also referred to as phase conductors. The terminals of the electric motor are formed in a plug casing, which is arranged, for example, on an end face of the stator aligned in the axial direction of the stator.

During assembly of the compressor, the plug-in connectors formed as pins are each inserted into a connection terminal provided in the plug casing and are each contacted with an end piece connected to a corresponding lead wire, in particular a connection line of the lead wire. In this case, the end piece is electrically and mechanically connected to the connection line of the lead wire in such a way, so as to ensure that there is only a low contact resistance between the plug-in connector of the inverter and the lead wire.

The plug casing must be electrically insulated and hermetically sealed from the plug-in connectors protruding from the motor casing and oriented towards the inverter arranged outside the motor casing, in order to ensure that no fluid flowing in the compressor, especially refrigerant and/or oil, escapes into the environment and that in the inverter no short circuits or damage occur, in particular to electrical components arranged on a printed circuit board of the inverter, which lead to failure of the compressor. In this case, especially the mechanical part of the compressor which is provided with gaseous refrigerant or oil with the electric motor and the compression mechanism driven by the electric motor must be sealed against the inverter as the electrical part of the compressor.

In order to comply with the required insulation resistances of the electrical components and to reliably and completely insulate the current-carrying elements from fluids flowing in the motor casing and any dirt that may be present, glass-to-metal feedthroughs of the plug-in connectors are conventionally used. The plug-in connectors formed of an electrically conductive metal are each passed through a through hole formed in a plate-shaped holding element and are insulated and held by means of glass toward the holding element. Alternatively, ceramic sleeves are used to insulate the plug-in connectors. In addition to high rigidity, both glass and ceramics have good insulating properties and result in a low creepage distance.

The holding element of the plug-in connectors, which is formed of a metal, leads to high material costs and production costs in connection with the glass seals and has a high weight. In addition, a restricted stamping process and special glass contours complicate the production of the combination of holding element and plug-in connectors. The plug-in connectors, which are formed of iron in particular, have a low current-carrying capacity and low electrical conductivity with a quality that is difficult to maintain.

The glass-to-metal feedthroughs of the plug-in connectors are fixed so as to be sealed by suitable sealing elements from a casing through which the connectors protrude, or are welded directly to the casing.

DE 2 309 825 A discloses current terminal arrangements for establishing electrical connections to the motor part of a hermetically sealed motor compressor unit with a plurality of conductor pins which are connected while inserted through spaced apart holes formed within a metal element and hermetically sealed to said metal element. The conductor pins are connected to the metal element by glass-to-metal seals. The metal element is configured to be introduced into an opening formed in a hermetically sealed casing. Side walls of the metal element are connected to the casing in a hermetically sealed manner by resistance welding, for example.

DE 11 2015 001 426 T5 discloses an electrically driven compressor with a compression arrangement, an electric motor for driving the compression arrangement, and an inverter for supplying the electric motor with electricity. The electric motor has a rotor and a stator having an electrically insulating coil bobbin arranged at one end of a stator core, coils arranged on the coil bobbin, and a plug casing with connection terminals for electrically connecting the coils to the inverter. The plug casing is mechanically connected to the stator on the end face of the bobbin. Plug-in connectors are passed through a plate-shaped holding element so as to be hermetically sealed. A hermetic seal is arranged between the holding element and a partition wall of the motor casing facing the inverter.

SUMMARY

The object of the invention is to provide a sealing arrangement for a device for driving an electrically driven compressor of a vaporous fluid, in particular an electric motor, which can be produced in a simple manner and assembled in a time-saving manner. The arrangement should have a smallest possible number of individual components and be structurally simple to implement, also to minimize production cost. In this case, the complexity of the structure of the sealing arrangement and thus of the device should be minimized with maximum current carrying capacity and electrical conductivity with the same dimensioning of the electrical feedthrough, while at the same time sealing the hermetic system from the environment and the electrical insulation inside the compressor are optimized.

The object is achieved by the subject matter with the features of the independent claims. Refinements are specified in the dependent claims.

The object is achieved by a sealing arrangement according to the invention for passing electrical connections through a wall of a casing for a device for driving a compressor, in particular an electric motor. The sealing arrangement has a connection arrangement with at least one electrically conductive connecting element and a holding element. The at least one connecting element is arranged within a through hole formed in the holding element and through a feedthrough hole of the casing so as to protrude into a volume enclosed by the casing.

According to the concept of the invention, the holding element is formed as an injection-molded component made of a plastic. A joining element is arranged between the holding element and the at least one connecting element, which full-circumferentially encloses the at least one connecting element. In addition, the holding element full-circumferentially encloses the joining element, so that the joining element is arranged between the connecting element and the holding element. The holding element, which is formed of a plastic, consequently serves not only to mechanically fix the connecting element but also as an electrical insulating element.

The at least one connecting element is advantageously formed cylindrically as a pin-shaped plug-in connector and preferably has the shape of a straight pin. The connecting element is in particular formed circular-cylindrically with a constant outer diameter.

The connecting element preferably serves to connect electrical terminals arranged inside the casing, in particular the lead wire of the coil of the stator of the electric motor, with electrical terminals arranged outside the casing, in particular of an inverter.

According to a refinement of the invention, the at least one connecting element, in the area of the arrangement within the through hole of the holding element, has a full-circumferentially formed notch. In this case, the holding element is preferably full-circumferentially arranged so as to engage with the notch.

According to a configuration of the invention, the joining element has the shape of a hollow cylinder, in particular a hollow circular cylinder. In this case, the joining element abuts preferably completely on the connecting element with an inner lateral surface. The joining element is advantageously formed as a thermal shrink tube, preferably formed of a thermoplastic material with a high elastic recovery when heat is applied, in particular of about ⅓.

The joining element can have an adhesive structure on the inner lateral surface for gluing the joining element to the connecting element.

The at least one electrically conductive connecting element is preferably formed of copper or of a copper alloy, in particular brass. Such formation results in low electrical resistance, high electrical conductivity and thus high current-carrying capacity or high ampacity. In addition, the contact resistance is minimal and heat generated at the contacts can be dissipated readily. Inexpensive contact elements can be utilized due to the low heat generation within the connecting element. In addition, the overall efficiency when operating a device with the sealing arrangement, in particular the connection arrangement, is increased.

A further advantage of the invention is that the holding element is arranged on an outside of the casing, abutting on the casing and tightly sealing the feedthrough hole of the casing.

According to a further configuration of the invention, the holding element is formed in the shape of a plate with surfaces arranged opposite one another. The at least one connecting element protrudes in each case from the holding element on the oppositely arranged surfaces.

The connection arrangement of the sealing arrangement can have at least three connecting elements, the longitudinal axes of which are arranged so as to be aligned parallel and spaced apart from one another.

The object is also achieved by a method according to the invention for producing a connection arrangement with at least one connecting element, one holding element and one joining element of a sealing arrangement for passing electrical connections through a wall of a casing. The method has the following steps:

- sliding the joining element, which has a shape of a circumferentially closed hollow cylinder, onto the connecting element, which has a shape of a cylinder, wherein the connecting element has a greater extension in the direction of a longitudinal axis than the joining element, and protrudes from the joining element on both sides,
- shrinking the joining element onto the connecting element by input of heat, and
- generating the holding element by means of injection molding and full-circumferential overmolding of the connecting element in the area of the joining element shrunk onto the connecting element.

The joining element can be shrunk onto the connecting element at a time prior to the holding element being generated and/or onto the connecting element during the generation of the holding element by means of injection molding.

According to a refinement of the invention, the surface of the joining element is subjected to surface treatment before it is slid onto the connecting element. In doing so, an inner lateral surface of the joining element is coated with an adhesive structure. During the process of shrinking onto the connecting element, the joining element is preferably glued to the connecting element.

According to an advantageous configuration of the invention, in the injection molding process the material of the holding element enters into a notch arranged adjacent to the joining element and formed in the surface of the connecting element, in particular filling the notch, so that a form fit is generated between the holding element and the connecting element.

The object is also achieved by a device according to the invention for driving a compressor of a vaporous fluid, in particular an electric motor. The device has a rotor and the immobile stator, which extend along a common longitudinal axis, and the casing. The stator is advantageously positioned in the radial direction on an outside of the rotor, enclosing the rotor.

According to the concept of the invention, the sealing arrangement according to the invention is formed on a first end face of the stator which is aligned in an axial direction.

At this point, the axial direction is to be understood as meaning the direction of the longitudinal axis of the stator, which also corresponds to the longitudinal axis and the axis of rotation of the rotor. An end face aligned in the axial direction is arranged in a plane aligned perpendicular to the longitudinal axis.

The advantageous configuration of the invention allows the use of the device for driving a compressor, in particular an electric motor, for compressing a vaporous fluid for a compressor of a refrigerant in a refrigerant circuit of an air conditioning system of a motor vehicle.

In summary, the sealing arrangement according to the invention or the device according to the invention for driving a compressor of a vaporous fluid with the sealing arrangement has furthermore a variety of advantages:

- a minimum number of components, since, for example, there are no separate sealing elements compared to arrangements from the prior art, in particular because the connection arrangement as a coherent, compact component is also formed of a robust insulating material,
- simple and time-saving assembly of components with low complexity, thereby reducing the assembly steps and minimal material, production and assembly costs, in particular cost reduction compared to the prior art by replacing the holding element made of metal with plastic without glass insulation of the connecting element, resulting in a simpler process chain, for example without costly and time-consuming tests to determine glass melting parameters, and minimizing the risk of breakage,
- maximum functional reliability with minimum weight of the components,
- high position tolerance of the connecting elements,
- possibility of an automated injection molding process and optimal connection of the plastic of the holding element with the electrically conductive connecting element, and
- high design flexibility, as many components can be integrated in the appropriate design, with the option of extending the creepage distances.

BRIEF DESCRIPTION OF THE DRAWINGS

Further details, features and advantages of configurations of the invention are apparent from the following description of exemplary embodiments with reference to the associated drawings. In the figures.

BACKGROUND

Figure 1A:
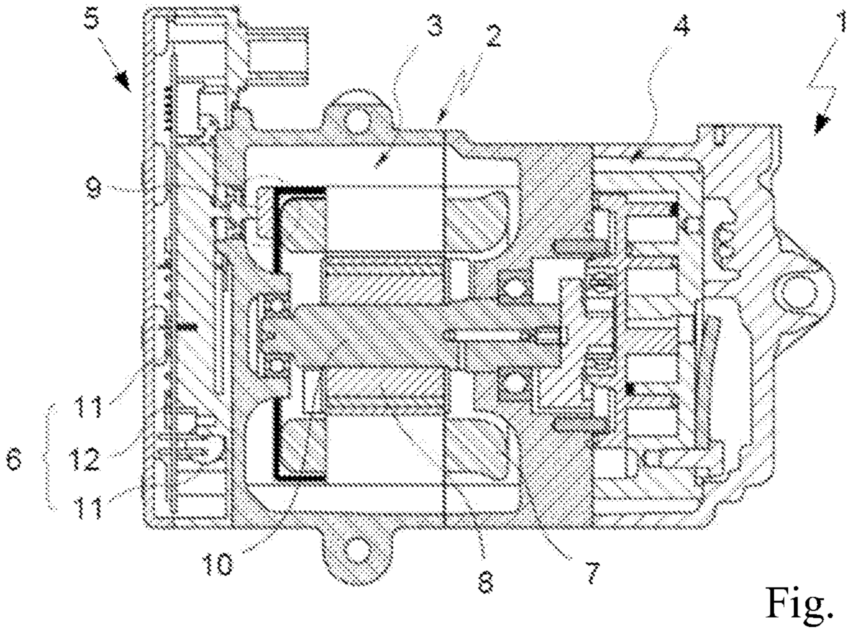
FIG. 1A: shows an electrically driven compressor with a device, in particular an electric motor, for driving a compression mechanism and an arrangement of an inverter in a sectional view.

FIG. 1A shows an electrically driven compressor 1 of a vaporous fluid, especially for an air conditioning system of a motor vehicle for conveying refrigerant through a refrigerant circuit, with an electric motor 3 arranged in a casing 2 as a device for driving a compression mechanism 4, and an arrangement of an inverter 5 in a sectional view. The electric motor 3 is supplied with electrical energy via a switching device 6 of the inverter 5.

The electric motor 3 has a stator 7 with a substantially hollow-cylindrically-shaped stator core and coils wound on the stator core, and a rotor 8 arranged inside the stator 7. The rotor 8 is set in rotation when the coils of the stator 7 are supplied with electrical energy via a connection arrangement 9. The connection arrangement 9 is formed on an end face of the stator 7 and has a plurality of electrical terminals.

The rotor 8 is arranged coaxially within the stator 7 and is rotatable about an axis of rotation. A drive shaft 10 may be formed integrally with the rotor 8, or as a separate element.

The electric motor 3 and the compression mechanism 4 formed, for example, as a scroll compressor with a fixed and an orbiting scroll are arranged within a volume enclosed by the casing 2. In this case, the casing 2 is formed from a first casing element for receiving the electric motor 3 and a second casing element for receiving the compression mechanism 4 and preferably formed of a metal, in particular aluminum.

The orbiting scroll of the compression mechanism 4, in which the vaporous fluid, specifically a refrigerant, is compressed, is driven via the drive shaft 10 connected to the rotor 8 of the electric motor 3. According to an embodiment (not shown), the compression mechanism can also be formed with a swash plate, for example.

The switching device 6 for controlling the operation of the electric motor 3 has a circuit board 12 formed with various switching elements 11. Different control circuits and components are assembled in an electrically connected manner on the circuit board 12 and are supplied with electrical energy from an external power source.

Figure 1B:
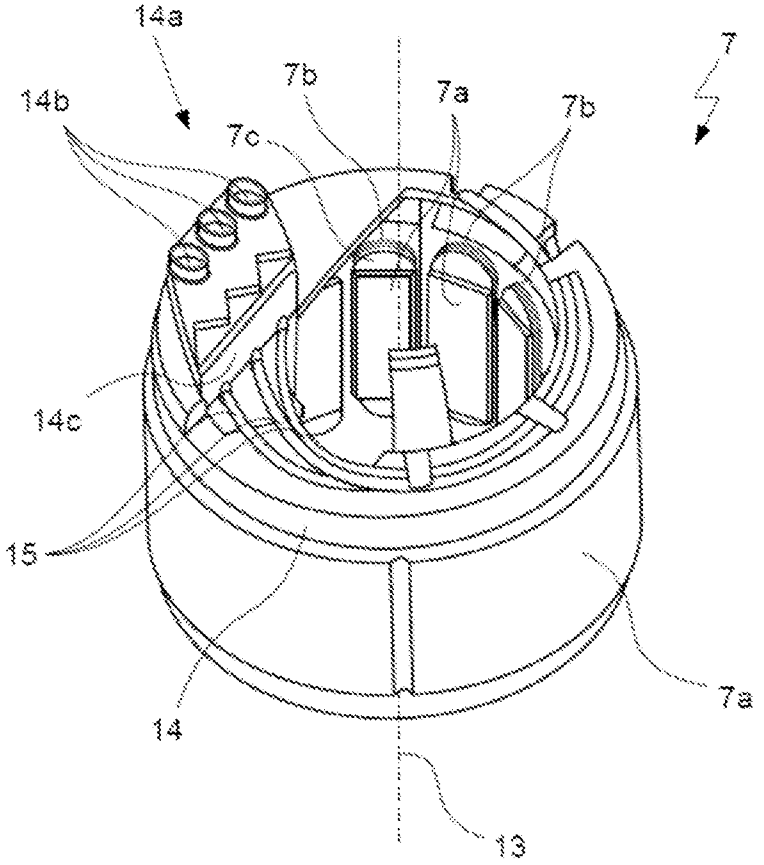
FIG. 1B: shows a stator of the electric motor with a stator core, coils, an insulation and a carrier element in a perspective view.

FIG. 1B shows a stator 7 of the electric motor 3 in a perspective view. The stator 7 is formed with a stator core 7*a*, coils 7*b*, an insulation 7*c*, and a support element 14 with a receiving element 14*a* for a plug casing 14*c*.

The electric motor 3, for example a three-phase AC motor, has the rotor 8 (not shown) and the stator core 7*a* arranged in the radial direction on an outside of the rotor and thus around the rotor. The stator core 7*a*, which is preferably formed as a laminated core, and the insulation 7*c*, which is formed from an electrically insulating material, each extend along a longitudinal axis 13, which also corresponds to the longitudinal axis of the stator 7 and the axis of rotation of the rotor, from a first end face to a second end face of the stator 7.

The coils 7*b* are each formed from a wire wound around an area of the stator core 7*a* that extends inwards in the radial direction, as an electrical conductor, also referred to as a lead wire 15. The non-wound ends of the lead wires 15 are led out of the respective winding as connection lines.

The stator core 7*a*, the insulation 7*c* and the coils 7*b* form the stator unit of the electric motor 3.

The carrier element 14 with the receiving element 14*a* with connecting passages 14*b* for the plug casing 14*c* with connection terminals is arranged on a first end face of the stator 7. The connection terminals of the plug casing 14*c* each serve as a component of an electrical connection between the coils 7*b* of the electric motor 3 and the inverter 5 (not shown), in particular electrically conductive, pin-shaped connecting elements, which are arranged so as to pass through the connecting passages 14*b* of the receiving element 14*a* of the carrier element 14 and to be inserted into the connection terminals of the plug casing 14*c*.

The connecting lines of the lead wires 15 of the coils 7*b* and the connection terminals of the plug casing 14*c* arranged in the receiving element 14*a* are electrically conductively connected to one another.

In the assembled state of the stator 7, the carrier element 14 with the receiving element 14*a* and the plug casing 14*c* arranged in the receiving element 14*a* abuts on the stator 7, in particular on the stator core 7*a*, in the axial direction. In this case, the receiving element 14*a* is formed as a component of the carrier element 14 for the plug casing 14*c*. The carrier element 14 with the receiving element 14*a* with the connection passages 14*b* for the plug casing 14*c* with the connection terminals is formed as one unit, in particular as a one-piece injection molded element. The one-piece formation is implemented as part of a molding process.

For introducing the connecting elements as electrical connectors to the inverter 5 (not shown) through the enclosure of the receiving element 14*a* into the plug casing 14*c*, the connection passages 14*b* are provided within the enclosure of the receiving element 14*a*. The connection passages 14*b* are aligned in the axial direction.

Figure 2A:
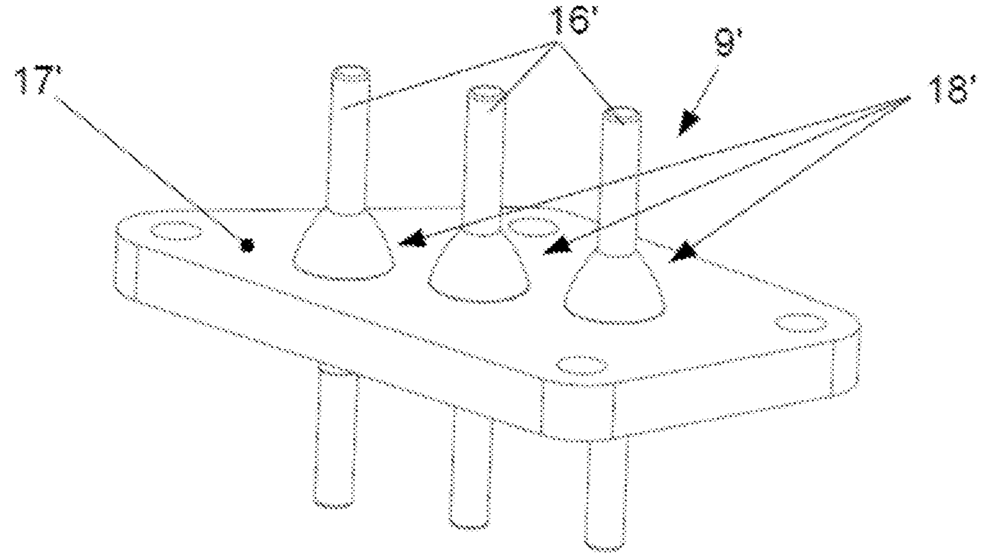
Fig. 2A Prior Art
FIG. 2A: shows a connection arrangement of a sealing arrangement for connecting elements with a holding element and molded elements for electrically connection terminals arranged in the plug casing to terminals of the inverter from the prior art in a perspective view.
Figure 2B:
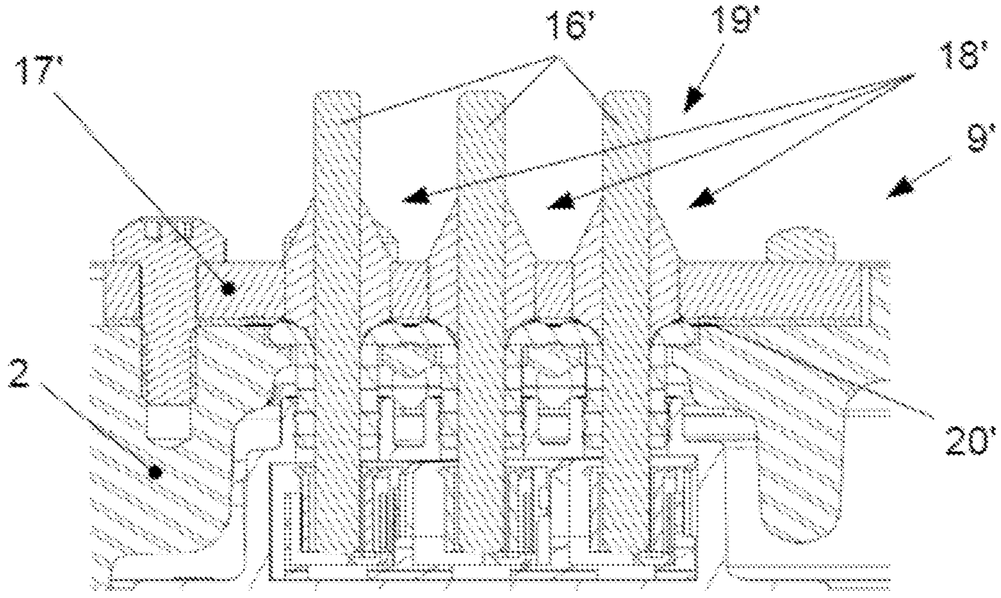
Fig. 2B Prior Art
FIG. 2B: shows a detail of a sealing arrangement with the connection arrangement from FIG. 2A with a sealing element from the prior art in a sectional view.

FIG. 2*a* shows a connection arrangement 9', in particular a glass-to-metal electrical feedthrough, of a sealing arrangement for connecting elements 16' with a holding element 17' and molded elements 18' for electrically connecting terminals arranged in the plug casing 14*c* (not shown) with terminals of the inverter 5 (not shown) from the prior art in a perspective view. FIG. 2B shows a detail of a sealing arrangement 19' with the connection arrangement 9' from FIG. 2*a* with a sealing element 20' for sealing the holding element 17' to the casing 2 from the prior art in a sectional illustration.

The connecting elements 16' are arranged so as to be passed through the plate-shaped holding element 17'. Each connecting element 16' which has the form of a straight pin, also referred to below as plug-in connector 16', is arranged so as to form three different areas, which are aligned along a common axis, in particular a longitudinal axis. In this case a first area and a second area protrude in each case from the opposing surfaces of the plate-shaped holding element 17'. A third area of the connector 16' is in each case arranged within the holding element 17'.

The plug-in connectors 16', which are preferably formed as straight circular cylinders with a diameter that is constant over the length, are each arranged with the third area within a through hole provided in the holding element 17'. In this case, the inner diameter of the through hole corresponds to the outer diameter of the plug-in connector 16' plus a clearance for assembling and fixing the plug-in connector 16' within the through hole. The gap formed between the plug-in connector 16' and the wall of the holding element 17' surrounding the through hole is filled by the molded element 18', in particular a molded glass element or a glass body. The molded element 18' that fills the gap and is preferably formed of glass serves on the one hand to fix the plug-in connector 16' within the through hole and thus to the holding element 17' and on the other hand to insulate the electrically conductive plug-in connector 16' from the holding element 17'. The molded element 18' protrudes in this case from the plane of the respective surface of the holding element 17' in the direction of the plug-in connector 16'. The projections of the molded element 18' each substantially have the shape of a cone or a truncated cone.

As can be seen from FIG. 2B, a sealing element 20' is arranged on the side of the holding element 17' facing the casing 2', which sealing element 20' seals the holding element 17' with the plug-in connector 16' and molded element 18' protruding from the holding element 17' against the casing 2. The sealing element 20', which abuts on the one hand in particular on a sealing seat surface of the casing 2 and on the other hand on the holding element 17', serves to hermetically seal the casing 2 and thus to prevent fluids flowing inside the casing 2, especially refrigerant and/or oil, from escaping into the environment and thus also to the inverter 5 (not shown) and to the electrical components arranged on the circuit board 12 of the inverter 5.

Figure 3A:
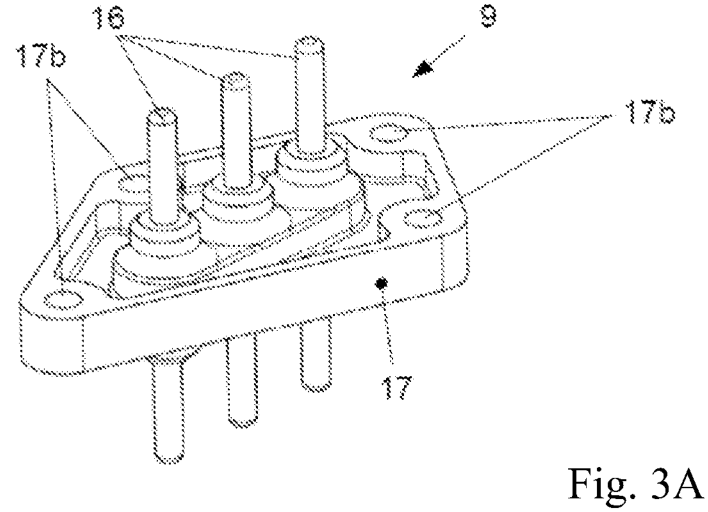
FIG. 3A to 3C: show a connection arrangement according to the invention of a sealing arrangement for passing electrical connections through a casing of a device for driving a compressor in different perspective views.
Figure 3B:
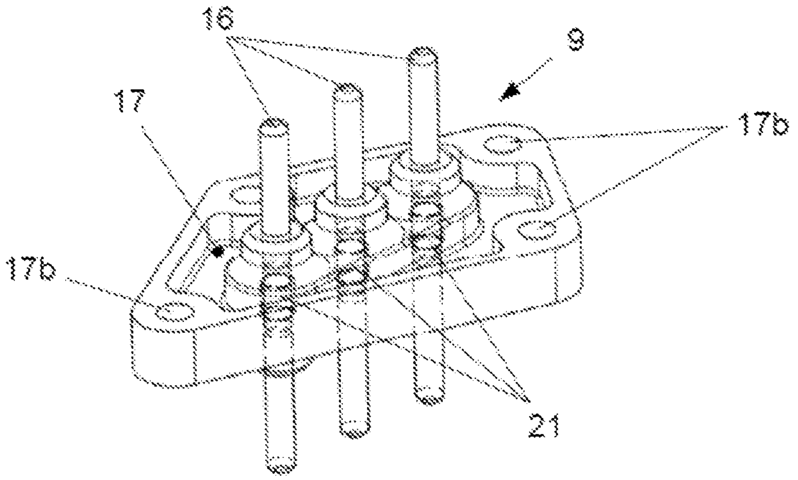
Figure 3C:
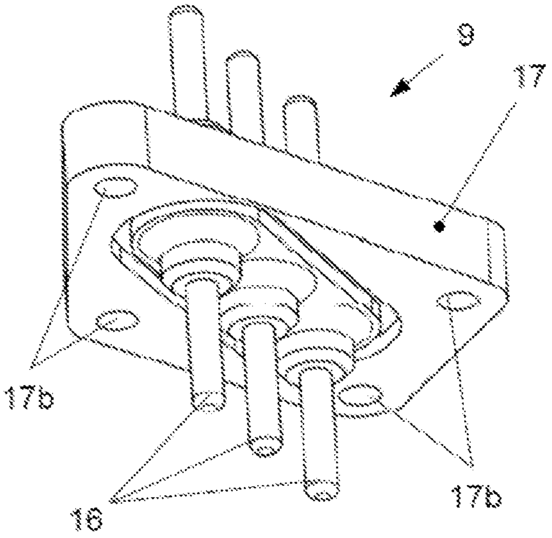
Figure 4A:
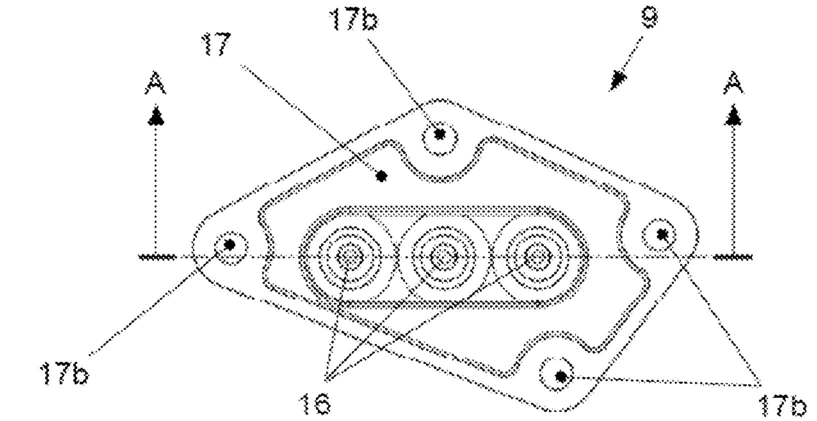
FIGS. 4A and 4B: show the connection arrangement from FIGS. 3A to 3C in a plan view and a lateral sectional view.
Figure 4B:
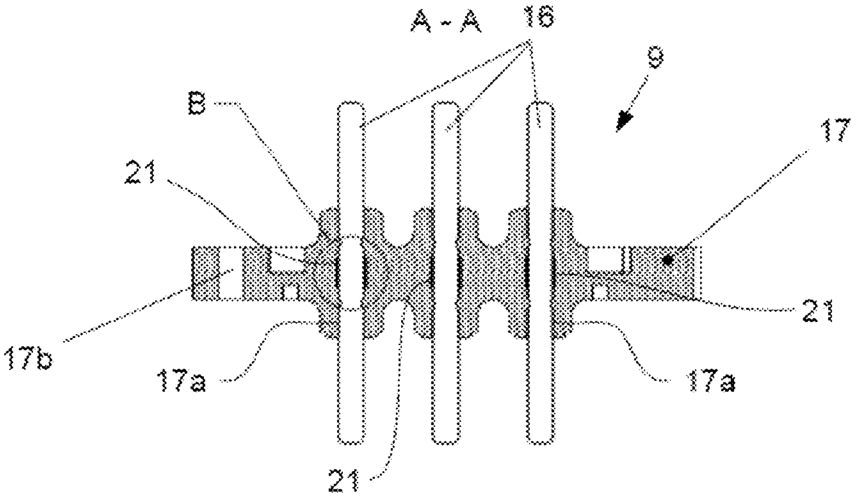
Figure 4C:
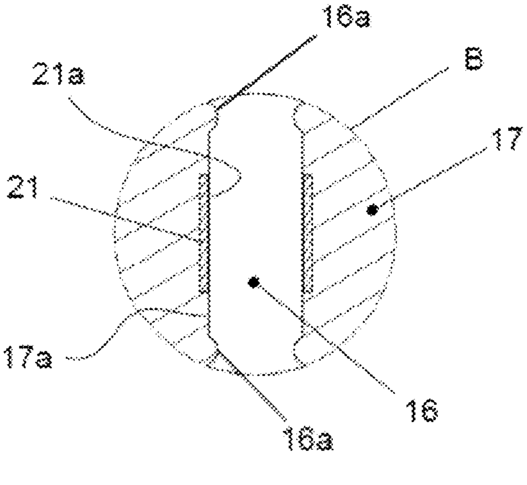
FIG. 4C: shows a detailed view of the lateral sectional view from FIG. 4B, FIGS. 5A to 5C: show a sealing arrangement with the connection arrangement from FIGS. 3A to 3C in connection with contact devices with a first and a second contact element for electrically connecting electrical terminals of the stator to electrical terminals of a circuit board of the inverter of the electric motor in a perspective exploded view, and in an assembled state in a perspective view and in a sectional view.

FIGS. 3A to 3C each show a connection arrangement 9 according to the invention of a sealing arrangement for passing plug-in connectors as electrical connecting elements 16 through the casing of a compressor, specifically as a connection to the electric motor 3 as a device for driving the compressor 1, in different perspective views, while the connection arrangement 9 from FIGS. 3A to 3C is shown in FIGS. 4A and 4B in a top view or a lateral sectional view. FIG. 4C shows a detailed view of the lateral sectional view from FIG. 4B.

The connecting elements 16 referred to as plug-in connectors for electrical connection of, for example, terminals arranged in the plug casing 14*c* (not shown) to terminals of the inverter 5 (not shown), are each arranged so as to pass through the preferably plate-shaped holding element 17, in particular within a through hole 17*a* provided in the holding element 17.

The connecting elements 16, each formed in the form of a straight pin, are aligned with the longitudinal axes parallel and spaced apart from one another. Each of a first area and a second area of the connecting elements 16 protrude from the opposite surfaces of the plate-shaped holding element 17, while a third area of each connector 16 formed between the first area and the second area is arranged within the holding element 17 and enclosed by said holding element 17.

In the third area of each plug-in connector 16 the holding element 17 protrudes from the plane of the respective surface in the direction of the longitudinal axis of the plug-in connector 16. The projections of the holding element 17 substantially have the shape of a cone or a truncated cone.

The holding element 17 is also formed with continuous receiving openings 17*b* for passing through fastening elements, for example screws. The fastening elements serve in particular for detachably connecting the holding element 17 to the casing (not shown).

The plug-in connectors 16, which are substantially formed as circular cylinders with a diameter that is constant over the length, are full-circumferentially enclosed in a section of the third area by a joining element 21 in the form of a hollow circular cylinder, in particular a tubular joining element 21, which can be seen specifically in FIGS. 3B, 4B and 4C. Each joining element 21 abuts completely on an outer lateral surface of a connector 16 with an inner lateral surface. The outer lateral surface of each joining element 21 is enclosed by the holding element 17. In this case, the through hole 17*a* for receiving a plug-in connector 16 has a greater extension in the direction of the longitudinal axis than the joining element 21, so that the joining element 21 is also covered by the holding element 17 at the end faces. The holding element 17 in each case abuts directly on the plug-in connector 16 in the area of the end faces of the joining element 21 and the projections protruding from the plane of the respective surface in the direction of the longitudinal axis of the plug-in connector 16. The joining element 21 is thus arranged completely within the holding element 17.

The inner lateral surface of the joining element 21 has been subjected to surface treatment and has an adhesive structure 21*a*, in particular an adhesive layer, on this surface. The adhesive structure 21*a* enables a stable and tight connection between the metallic plug-in connector 16 and the joining element 21 and thus the holding element 17 formed of a plastic. The adhesive structure 21*a* serves to close the surface of the joining element 21. The elastic behavior of the adhesive structure 21*a* within a specific temperature range provides a sealing effect. The outer lateral surface of the joining element 21 is connected to the holding element 17 by means of injection molding when the holding element 17 is manufactured.

The heat to be applied for shrinking the tubular joining element 21 is applied by the injection molding process of the holding element 17 and thus by the overmolding of the plug-in connector 16 with the holding element 17. During the injection molding of the holding element 17 and the overmolding of the plug-in connector 16, heat present in the molten plastic is also transferred to the joining element 21. The heat required to deform the joining element 21 can also be introduced by an additional heating process before the injection molding process.

When the connection arrangement 9 is produced, in each case, a joining element 21 is pushed over a plug-in connector 16 and preferably thermally shrunk onto the plug-in connector 16 at least in a predetermined section by supplying heat. During the process of shrinking the joining element 21 onto the plug-in connector 16, surface adhesion is generated on the plug-in connector 16 via an elastic phase of the joining element 21. As a result of the subsequent injection molding process of the holding element 17 by overmolding the plug-in connectors 16, the metal-plastic connection between the plug-in connector 16 and the holding element 17 becomes fluid-tight. The prefabricated surface treatment of the joining element 21 on the inner lateral surface enables precise positioning and definition of the quantity of the adhesive structure 21*a* in order to ensure a secure connection of the plug-in connectors 16 within the holding element 17.

In addition to the force-fit and firmly bonded connection of plug-in connector 16, joining element 21 and holding element 17, a form-fit connection between plug-in connector 16 and holding element 17 is also provided. In this case, the plug-in connector 16 is formed with at least one full-circumferentially formed local cross-sectional taper in the form of a notch 16*a* or constriction. In the embodiment shown in FIG. 4C, a pair of the notches 16*a* is formed in the holding element 17, each notch of the pair of the notches 16*a* formed adjacent each respective end of the joining element 21. During the injection molding process the holding element 17 around the plug-in connector 16, the molten and therefore liquid plastic enters into the notch 16*a* of the plug-in connector 16, so that the holding element 17 is also form-fittingly connected to the plug-in connector 16 after cooling.

The plug-in connectors 16 are advantageously formed of pure copper or brass in order to have maximum electrical conductivity. As a result, a maximum current-carrying capacity of the plug-in connectors 16 is also achieved. The electrically conductive plug-in connectors 16 are insulated from the environment by the molded plastic holding element 17. As a result, the holding element 17 serves not only to hold and to arrange the plug-in connectors 16 in a targeted manner, but also as electrical insulation for the plug-in connectors 16.

Figure 5A:
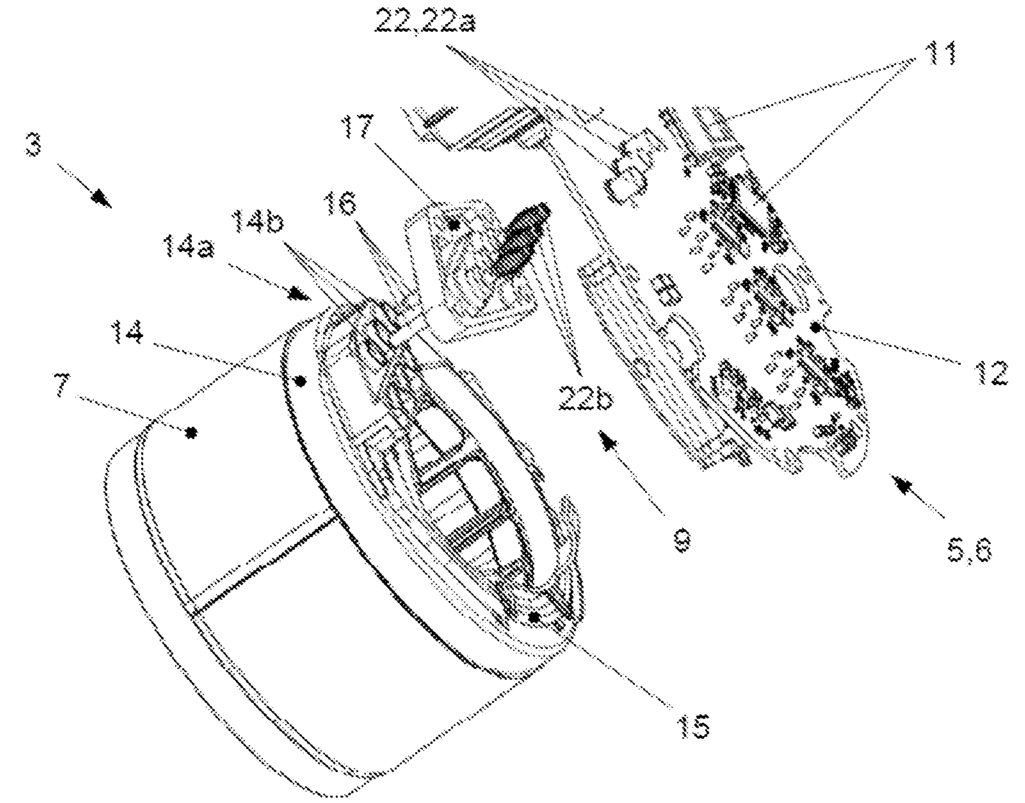
Figure 5B:
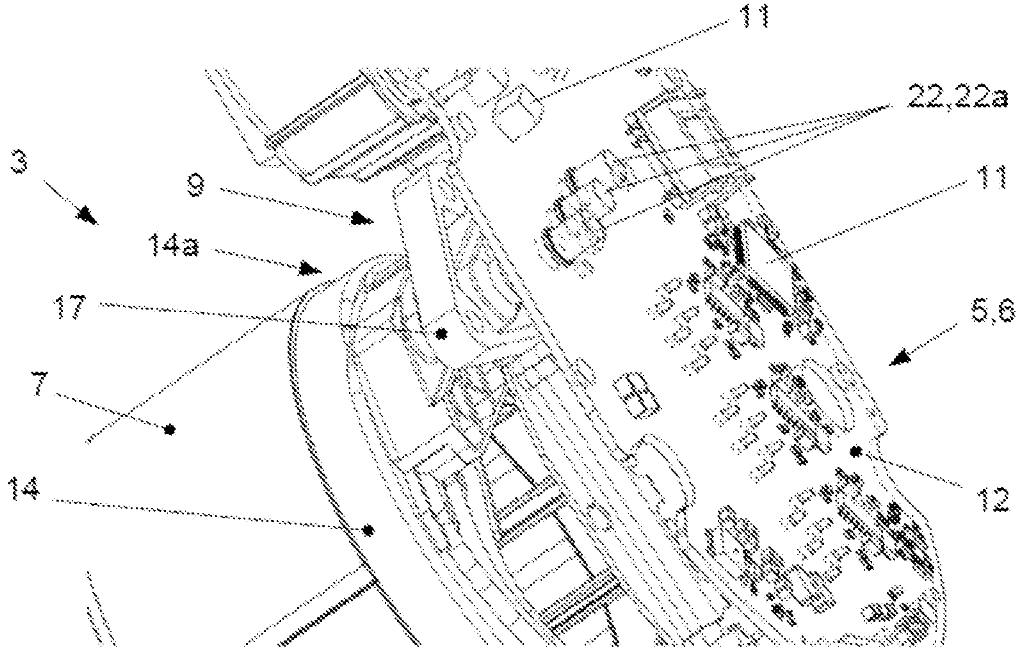
Figure 5C:
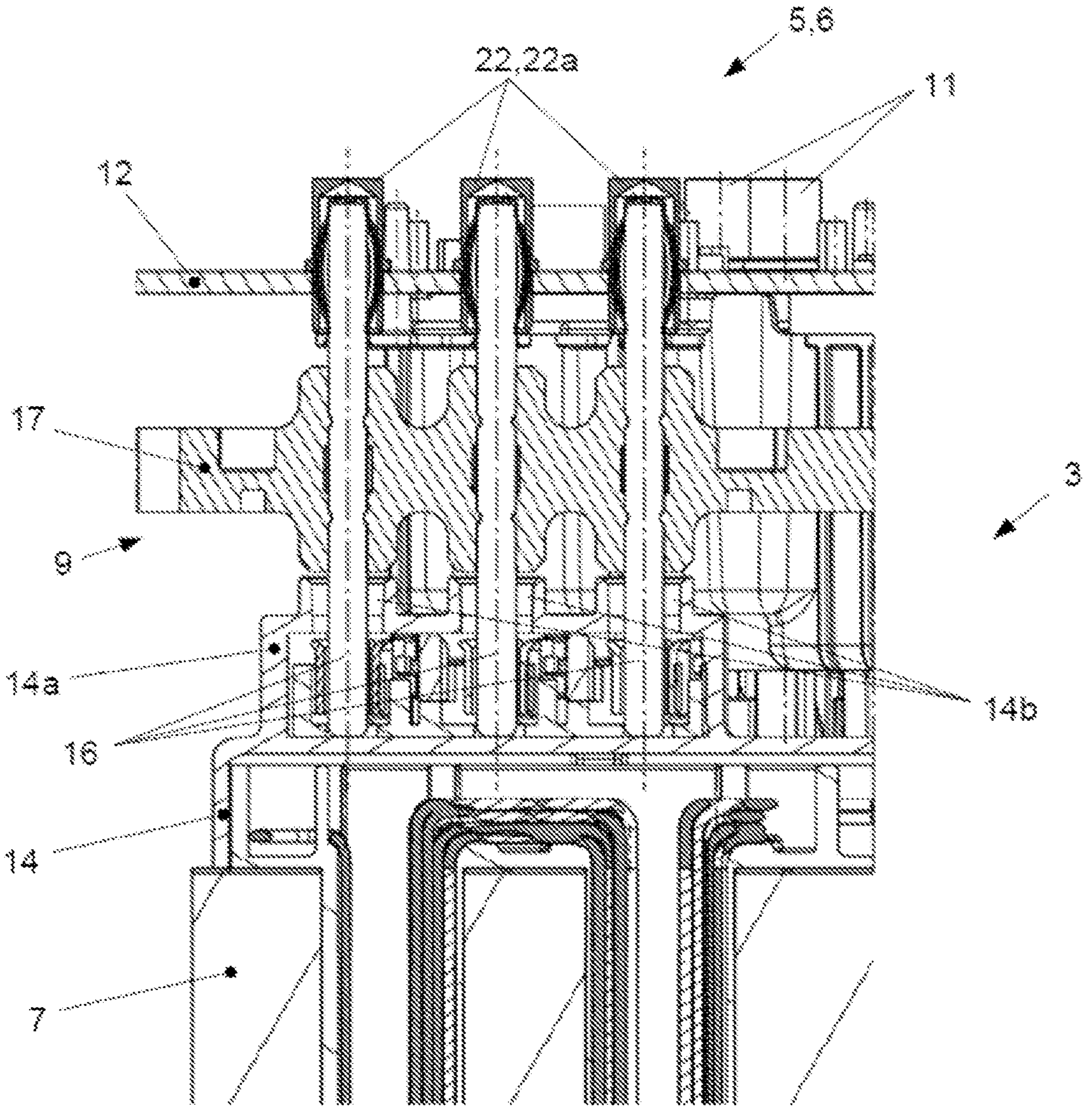

FIGS. 5A to 5C each show a sealing arrangement with the connection arrangement 9 from FIGS. 3A to 3C in connection with contact devices 22 having a first contact element 22*a* and a second contact element 22*b* for electrically connecting electrical terminals of the stator 7 to electrical terminals of the circuit board 12 of the inverter 5 of the electric motor 3 in a perspective exploded view and in an assembled state in a perspective view and in a sectional view.

FIGS. 5A to 5C each show the stator 7 from FIG. 1B with the lead wires 15 and the carrier element 14, which has the receiving element 14*a* for the plug casing and the axially aligned connecting passages 14*b* for introducing the plug-in connectors 16 into the connector casing.

For secure electrical connection while compensating for production tolerances that occur, the contact device 22 has two contact elements 22*a*, 22*b* arranged coaxially to one another, which extend in the assembled state of the contact device 22 along the longitudinal axis of the plug-in connector 16 as a common longitudinal axis. The first contact element 22*a* formed as a substantially hollow-cylindrical contact sleeve with a closed end face is arranged in the radial direction on an outside of the second contact element 22*b*, completely enclosing the second contact element 22*b*. In this case, the second contact element 22*b* is formed as a spring contact element, in particular with elastically deformable lamellar contact springs.

FIG. 5A shows both first contact elements 22*a* each of which is fixed to the circuit board 12, and second contact elements 22*b* of the contact device 22 each of which is pushed onto an area of the plug-in connector 16 protruding from the holding element 17. FIG. 5B shows an assembled state of the stator 7, holding element 17 and circuit board 12, in which the second contact elements 22*b* are pushed in each case into the first contact elements 22*a* of the contact device 22. In this case, the second contact elements 22*b* are each arranged completely within the first contact elements 22*a*.

The first contact element 22*a* substantially has the shape of a hollow-cylindrical sleeve with a closed end face having a first section and a second section, each of which extends in the axial direction of the sleeve and which are connected to one another via a section formed as a formation, specifically as a seat or flange. The formation is full-circumferentially formed on an outer surface of the sleeve. The first section consequently extends from a first end face of the sleeve to the formation, while the second section extends from a second, closed end face of the sleeve to the formation.

The sleeve also has an opening extending from the first end face to the second, closed end face of the sleeve, in particular an opening formed as a blind hole, with an inner diameter that is preferably constant over the length for receiving the second contact element 22*b*. The closed end face of the first contact element 22*a* serves as a stop for the second contact element 22*b* when assembling the contact device 22, and for fixing the second contact element 22*b* between the plug-in connector 16 and the first contact element 22*a*. In this case, the closed end face of the first contact element 22*a* prevents the second contact element 22*b* from being unintentionally displaced along the plug-in connector 16 during assembly.

The first contact element 22*a* in the form of a hollow circular cylinder is formed with a substantially constant wall thickness. The formation is aligned in a plane running perpendicularly to the longitudinal axis of the first contact element 22*a* and protrudes from the outer surfaces of the sections in the radial direction, so that the first contact element 22*a* is formed in the area of the formation with a greater wall thickness.

The extension of the first contact element 22*a* in the axial direction, specifically of the opening of the first contact element 22*a* formed as a blind hole, preferably corresponds substantially at most to the length of the area of the plug-in connector 16 protruding from the holding element 17.

The first contact element 22*a* is arranged directly in the circuit board 12 and soldered to the circuit board 12. The contact sleeve is arranged so as to be inserted first end face first through a through hole formed in the circuit board 12 and abuts with the flange-shaped or bulge-like formation on a surface of the circuit board 12. The formation consequently serves as an axial stop and support during assembly. On the one hand, the first contact element 22*a* protrudes from the circuit board 12 with the second section and the formation on a first surface of the circuit board 12. On the other hand, the first contact element 22*a* protrudes from the circuit board 12 with part of the first section from a second surface of the circuit board 12.

The diameter of the through hole provided in the circuit board 12 substantially corresponds to the outer diameter of the first section of the first contact element 22*a* plus a clearance for assembling and for soldering the components. The surface of the first contact element 22*a* formed of metal is treated, in particular coated, specifically tinned, for reflow soldering, for example.

The shape and design of the first contact element 22*a* is suitable for automatically populating the circuit board 12. After the first contact element 22*a* has been automatically inserted into the through hole of the circuit board 12, the first contact element 22*a* is connected to the circuit board 12 by soft-soldering. With the formation formed as an axial stop, a sufficient soldering gap is also ensured during the soldering process in order to absorb all loads during assembly and operation.

During the assembly process, a second contact element 22*b*, likewise in the form of a sleeve, formed as a spring contact element, in particular with elastically deformable lamellar contact springs, is pushed onto one of the plug-in connectors 16 of the connection arrangement 9, which are coupled to one another via the holding element 17. The wall of the second contact element 22*b* is formed in the area of the end faces in the form of a circular ring and in the area of the lamellar contact springs so as to uniformly bulge radially outward. The strip-shaped lamellar contact springs are connected to one another at the end faces.

In the area of the end faces, the second contact element 22*b* has an inner diameter in each case which is slightly smaller than the outer diameter of the plug-in connector 16, so as to abut on the outer surface of the plug-in connector 16 with the inner surface when the device is in the assembled state, generating a spring force, and thus establishing an electrical contact to the plug-in connector 16. To apply the spring force during assembly and in the assembled state of the device, the circular ring formed in each case in the area of the end faces of the wall of the second contact element 22*b* is formed with a preferably slot-shaped opening, in particular fully slotted in the axial direction. The opening allows at least a slight increase in the diameter of the circular ring in order to generate the necessary spring force in this way.

In the area formed with the lamellar contact springs, the second contact element 22*b* has a maximum outer diameter which is larger than the inner diameter of the first contact element 22*a*. When introducing the second contact element 22*b* into the opening of the first contact element 22*a*, the individual lamellar contacts are placed against the inner surface of the first contact element 22*a* and are thereby elastically deformed in order to establish electrical contact between the contact elements 22*a*, 22*b* of the contact device 22 in this way.

Depending on the assembly sequence, the second contact element 22*b* is captively fixed either in the area of the end faces on the plug-in connector 16 or in the area of the lamellar contact springs within the first contact element 22*a* due to the elastic deformation.

During assembly of the device, the circuit board 12 with the first contact elements 22*a* arranged in the circuit board 12 and firmly connected to the circuit board 12 is pushed onto the plug-in connectors 16 of the connection arrangement 9 with the second contact elements 22*b* plugged onto the plug-in connectors 16 in such a way that the second contact elements 22*b* are arranged with the connectors 16 within the first contact elements 22*a*.

In the assembled state of the device, the second contact elements 22*b* are each fixed within a gap-shaped, in particular substantially annular gap-shaped intermediate space formed between an outer surface of the plug-in connectors 16 and an inner surface of the first contact element 22*a*.

The first contact element 22*a*, the second contact element 22*b* and the plug-in connector 16 are aligned and arranged in the assembled state in such a way so as to ensure sufficient tolerance compensation in order to accommodate the plug-in connectors 16 even under extreme tolerance conditions and to ensure an electrical connection between the circuit board 12 and the plug-in connector 16.

In the assembled state of the electric motor 3, the holding element 17 abuts on the casing (not shown). In this case, the areas of the plug-in connectors 16 pointing towards the stator 7 and protruding from the holding element 17 are arranged so as to pass through a feedthrough hole formed in the casing and with the free ends thereof through the connecting passages 14*b* of the carrier element 14 and to be introduced into the plug casing.

The holding element 17 abuts on a sealing seat surface of the casing with the surface oriented towards the casing, sealing the casing hermetically. Alternatively, depending on the material of the holding element 17, an additional sealing element can be arranged on the side of the holding element 17 oriented towards the casing, which seals the holding element 17 towards the casing. The sealing element, which in particular abuts on a sealing seat surface of the casing on the one hand and on the holding element 17 on the other hand, can be formed of an elastomer and serves to hermetically seal the casing.

The tight closure of the casing prevents fluids flowing inside the casing, specifically refrigerant and/or oil, from escaping into the environment and thus also to the inverter 5 and to the electrical components arranged on the circuit board 12 of the inverter 5.

LIST OF REFERENCE NUMERALS

1 compressor
2 casing
3 electric motor
4 compression mechanism
5 inverter
6 switching device
7 stator
7*a* stator core
7*b* coil
7*c* insulation
8 rotor
9, 9' connection arrangement
10 drive shaft
11 switching element
12 circuit board
13 longitudinal axis
14 carrier element
14*a* receiving element
14*b* connecting passage
14*c* plug casing
15 lead wire
16, 16' connecting element, plug-in connector
16*a* notch
17, 17' holding element
17*a* through hole of holding element 17
17*b* receiving opening
18' molded element
19' sealing arrangement
20' sealing element
21 joining element
21*a* adhesive structure
22 contact device
22*a* first contact element of the contact device 22
22*b* second contact element of the contact device 22

What is claimed is:

1. A sealing arrangement for passing electrical connections through a wall of a casing for a device for driving a compressor, the sealing arrangement comprising:
- a connection arrangement with at least one electrically conductive connecting element; and
- a holding element, wherein the at least one connecting element is arranged within a through hole formed in the holding element and through a feedthrough hole of the casing so as to project into a volume enclosed by the casing, wherein the holding element is formed as an injection-molded component made of a plastic, wherein a joining element is arranged between the holding element and the at least one connecting element, which full-circumferentially encloses the at least one connecting element, wherein the holding element full-circumferentially encloses the joining element, wherein the holding element protrudes from an upper end and a lower end of the holding element, respectively, for each of the at least one connecting element, and wherein the at least one connecting element, in an area of the sealing arrangement within the through hole of the holding element, has a pair of full-circumferentially formed notches, each of the pair of notches formed adjacent each respective end of the joining element, and adjacent to where the holding element protrudes from the upper end and the lower end, into which the holding element is arranged to engage with the pair of notches.

2. The sealing arrangement according to claim 1, wherein the at least one connecting element is formed cylindrically as a pin-shaped plug-in connector.

3. The sealing arrangement according to claim 2, wherein the at least one connecting element is formed circular-cylindrically with a constant outer diameter.

4. The sealing arrangement according to claim 1, wherein the joining element has a shape of a hollow cylinder, wherein the joining element is arranged so as to abut the connecting element with an inner lateral surface.

5. The sealing arrangement according to claim 4, wherein the joining element is formed as a thermal shrink tube.

6. The sealing arrangement according to claim 4, wherein the joining element has an adhesive structure on the inner lateral surface for gluing the joining element to the connecting element.

7. The sealing arrangement according to claim 1, wherein the at least one electrically conductive connecting element is formed of copper or of a copper alloy.

8. The sealing arrangement according to claim 1, wherein the holding element is arranged on an outside of the casing so as to abut the casing and to tightly seal the feedthrough hole of the casing.

9. The sealing arrangement according to claim 1, wherein the holding element is formed in a shape of a plate with surfaces arranged opposite one another.

10. The sealing arrangement according to claim 9, wherein the at least one connecting element is arranged so as to protrude from the holding element.

11. The sealing arrangement according to claim 1, wherein at least three connecting elements are formed, longitudinal axes of which are arranged so as to be aligned parallel and spaced apart from one another.

12. A method for producing the connection arrangement with the at least one connecting element, the holding element and the joining element of the sealing arrangement for passing the electrical connections through the wall of the casing according to claim 1, having steps of:
- sliding the joining element, which has a shape of a circumferentially closed hollow cylinder, onto the connecting element, which has a shape of a cylinder, wherein the connecting element has a greater extension in a direction of a longitudinal axis than the joining element and protrudes from both sides from the joining element,
- shrinking the joining element onto the connecting element by input of heat, and
- generating the holding element by means of injection molding and full-circumferential overmolding of the connecting element in an area of the joining element shrunk onto the connecting element.

13. The method according to claim 12, wherein the joining element is shrunk onto the connecting element at a time prior to the holding element being generated, and/or onto the connecting element during the generation of the holding element by means of the injection molding.

14. The method according to claim 12, wherein the joining element is subjected to surface treatment before it is slid onto the connecting element, wherein an inner lateral surface of the joining element is coated with an adhesive structure.

15. The method according to claim 12, wherein the joining element is glued to the connecting element during the shrinking the joining element onto the connecting element.

16. The method according to claim 12, wherein during the injection molding of the holding element, molten material forming the holding element enters into each of the pair of notches arranged adjacent to each respective end of the joining element and formed in a surface of the connecting element.

17. A device for driving a compressor of a vaporous fluid having a rotor and a stator, which are arranged so as to extend along a common longitudinal axis, and the casing, wherein the sealing arrangement according to claim 1 is formed on a first end face of the stator aligned in an axial direction.

18. Use of the device for driving the compressor for compressing the vaporous fluid according to claim 17 for the compressor of a refrigerant in a refrigerant circuit of an air conditioning system of a motor vehicle.

* * * * *